US005661809A

United States Patent [19]

Chahabadi et al.

[11] Patent Number: 5,661,809
[45] Date of Patent: *Aug. 26, 1997

[54] RADIO RECEIVER HAVING DIGITAL SIGNAL PROCESSING

[75] Inventors: Djahanyar Chahabadi; Matthias Herrmann; Lothar Vogt, all of Hildesheim; Juergen Kaesser, Diekholzen, all of Germany

[73] Assignee: Blaupunkt-Werke GmbH, Hildesheim, Germany

[*] Notice: The term of this patent shall not extend beyond the expiration date of Pat. No. 5,592,557.

[21] Appl. No.: 343,413

[22] PCT Filed: Mar. 22, 1994

[86] PCT No.: PCT/DE94/00324

§ 371 Date: Feb. 14, 1995

§ 102(e) Date: Feb. 14, 1995

[87] PCT Pub. No.: WO94/22231

PCT Pub. Date: Sep. 29, 1994

[30] Foreign Application Priority Data

Mar. 24, 1993 [DE] Germany .......................... 43 09 518.6

[51] Int. Cl.[6] .................................................. H04H 5/00
[52] U.S. Cl. ............................................. 381/13; 381/10
[58] Field of Search .................................. 381/7, 10, 11, 381/13, 4, 2, 3, 1

[56] References Cited

U.S. PATENT DOCUMENTS 4,688,254  8/1987  Ecklund .................................. 381/10
4,703,501 10/1987  Sugai et al. ........................... 381/10
4,727,580  2/1988  Sakai ..................................... 381/7
4,959,859  9/1990  Manlove et al. ..................... 381/10
4,982,431  1/1991  Tanno .................................... 381/7
5,253,298 10/1993  Parker et al. ........................ 381/13
5,432,854  7/1995  Honjo et al. ......................... 381/10

FOREIGN PATENT DOCUMENTS 0 320 883 A2  6/1989  European Pat. Off. .
0 449 199 A2 10/1991  European Pat. Off. .
0 472 865 A3  3/1992  European Pat. Off. .

OTHER PUBLICATIONS

Reich et al., "Digital FM-Stereo Demodulation and Decoding", *Signal Processing IV: Theories and Applications*, Bd. 2, 8, Sep. 1988, Grenoble, France, pp. 499–502.

*Primary Examiner*—Curtis Kuntz
*Assistant Examiner*—Vivian Chang
*Attorney, Agent, or Firm*—Kenyon & Kenyon

[57] ABSTRACT

A radio receiver is provided having digital signal processing, a first and a second auxiliary signal derived from a received stereo multiplex signal, the first auxiliary signal being dependent upon the existence of signal components, whose frequency lies above the fundamental frequency range of the stereo multiplex signal, and the second auxiliary signal being dependent upon the symmetry of the sidebands of the stereo subcarrier. The first and the second auxiliary signal are combined to form an interference signal indicating the existence of interference. At least one control signal is derived from the interference signal to influence the audio signals acquired by decoding the stereo multiplex signal.

16 Claims, 4 Drawing Sheets

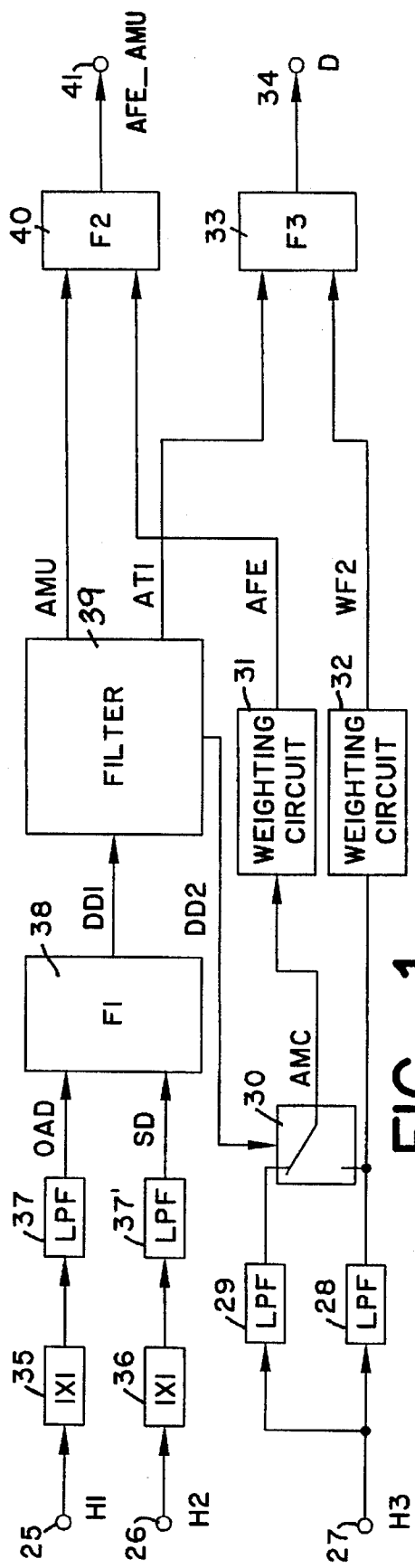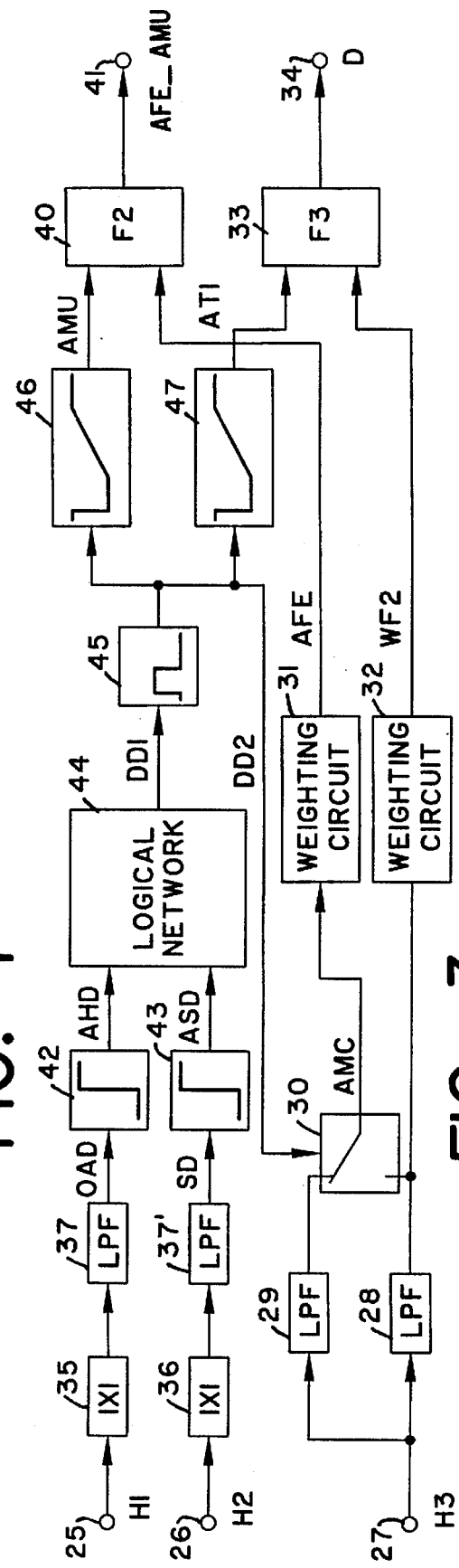
FIG. 1
FIG. 3

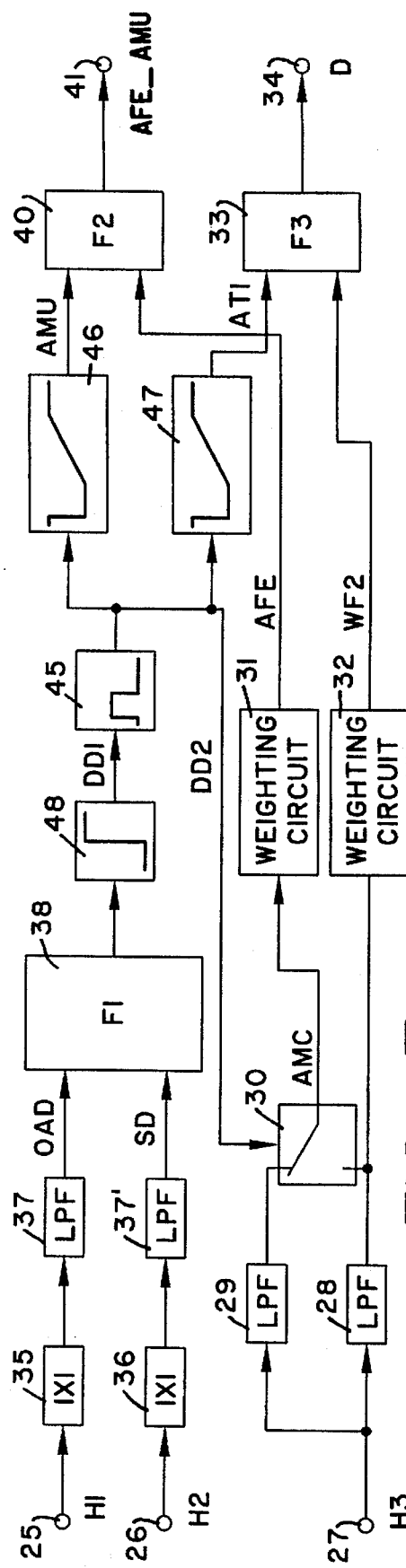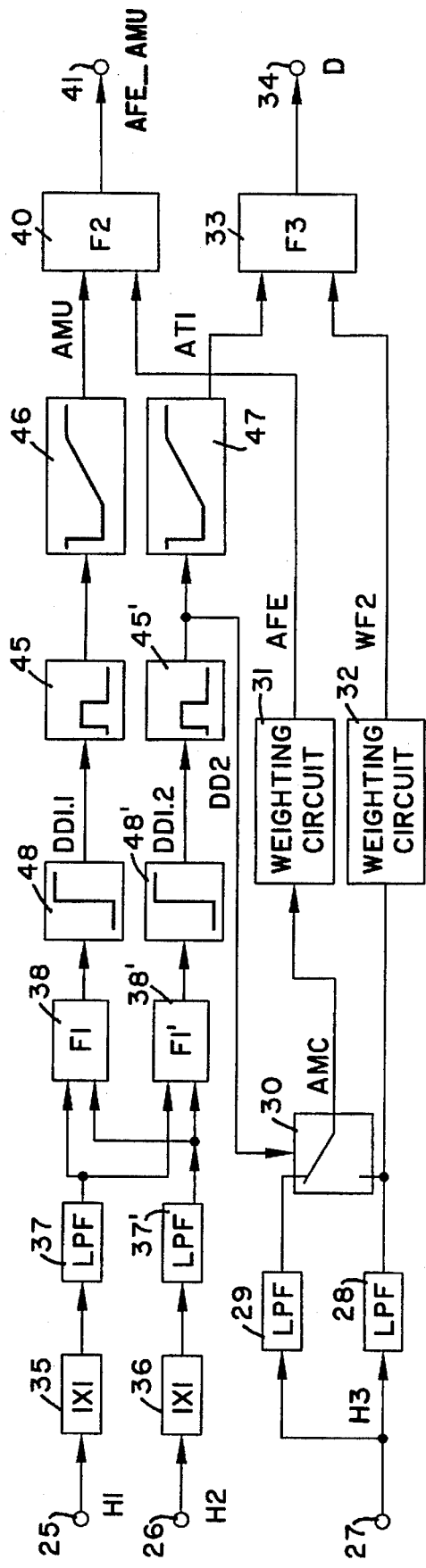

RADIO RECEIVER HAVING DIGITAL SIGNAL PROCESSING

FIELD OF THE INVENTION

The invention relates to a radio receiver having digital signal processing.

BACKGROUND INFORMATION

Reception quality can fluctuate heavily, particularly in car radios, due, for example, to multipath reception, the reception of spurious signals, or due to breaks in the received field strength. To keep the resultant interference as low as possible, various measures have been disclosed for masking this interference in the audio signal. It is, for example, possible in the case of a poor reception, to temporarily attenuate the audio signals or to reduce the stereo channel separation. These measures presuppose that interference in the received signal can be perfectly determined.

The object of the present invention is to disclose a radio receiver having digital signal processing, in the case of which interference in the received signal, in particular such interference which also leads to audible interference, is recognized and, from that, signals are derived for controlling the reproduction of the audio signals.

SUMMARY OF THE INVENTION

This objective is solved according to the present invention in that a first and a second auxiliary signal are derived from a received stereo multiplex signal, the first auxiliary signal being dependent upon the existence of signal components whose frequency lies above the fundamental (useful) frequency range of the stereo multiplex signal, and the second auxiliary signal being dependent upon the symmetry of the sidebands of the stereo subcarrier;

that the first and the second auxiliary signal are combined to form an interference signal indicating the existence of interference; and that at least one control signal is derived from the interference signal to influence the audio signals acquired by decoding the stereo multiplex signal.

The radio receiver according to the present invention has the advantage of enabling an appropriate reaction to different types of interference through the use of two auxiliary signals. It is thus possible, for example, to use the first auxiliary signal to allow a rapid and sensitive reaction to interference, even when transmitters are being received which do not send out a modulated subcarrier and, in particular, do not send out a stereo differential signal at the frequency of the subcarrier. The advantage of using the second auxiliary signal is that interference is only detected when it actually has an adverse effect on the audio signal.

Although in the case of the radio receiver according to the present invention it is also possible to process the auxiliary signals with a large range of values of, for example, 256 values, various specific embodiments are directed to a processing as binary signals, which can only assume the levels 0 and 1.

A first advantageous specific embodiment of the radio receiver according to the present invention consists in that the first and the second auxiliary signals are converted into binary signals, which are combined (gated) in a logic operation to form the interference signal. Besides allowing for a relatively simple further processing of the binary signals, this specific embodiment advantageously makes it possible to program a selection of the logic combination (AND operation or OR operation) or also to program an exclusive use of one of the auxiliary signals. Thus, for example, those radio receivers manufactured according to this specific embodiment, which are supplied to countries that do not have stereo-signal transmission, are programmed to only allow evaluation of the first auxiliary signal.

A second advantageous specific embodiment of the radio receiver according to the present invention is characterized in that the first and the second auxiliary signal are added, each after being weighted with a coefficient, and that, in dependence upon whether the resultant sum is larger or smaller than a threshold value, a binary interference signal is generated. This specific embodiment has the advantage over the first specific embodiment of allowing a wider range of possibilities for combining the two auxiliary signals.

A third advantageous specific embodiment of the radio receiver provides for a first control signal for attenuating the audio signals and a second control signal for reducing the channel separation in the stereo decoder to be generated during the occurrence of interference, and for the first and the second auxiliary signal to be added, after having been weighted with various coefficients, to form a control signal in each case, and for generating a binary interference signal in each case from the sums through a comparison with a threshold value, from which interference signal the first and the second control signal are derived. This specific embodiment also renders possible various combinations of the first and second auxiliary signal to produce the various control signals.

While the interference has a different time characteristic depending on its cause, limits are set to the influencing of the audio signals, so that no additional interference arises. It is, therefore, provided in one further development of the present invention for the interference signal to be subjected to a time filtering. It is preferably provided for the time filtering to be comprised of a pulse-duration discriminator and a subsequent integrator with various time constants for the integration devices. On the one hand, this prevents an intervention into the audio signals from taking place just because of very short interference. On the other hand, it is guaranteed that the volume (loudness level) or the channel separation is reduced as quickly as possible at the beginning of the interference, while a gradual return to the original level is undertaken.

The effect of interference in the received signal is dependent upon the receiving field strength. Therefore, another further development provides for the filtered interference signal to be multiplied by a field-strength signal, which is dependent upon the receiving field strength, to generate a control signal.

One advantageous specific embodiment of this further development consists in that a first filtered interference signal is multiplied by a first field-strength signal to generate a control signal for attenuating the audio signals, and that a second filtered interference signal is multiplied by a second field-strength signal to generate a control signal that reduces the channel separation. In this manner, the dependency of each of the control signals on the receiving field strength can be selected independently of one another.

BRIEF DESCRIPTION OF THE DRAWINGS

FIG. 1 shows a first exemplary embodiment of a circuit according to the present invention.

FIG. 3 shows a second exemplary embodiment of a circuit according to the present invention.

FIG. 7 shows a third exemplary embodiment of a circuit according to the present invention.

FIG. 8 shows a fourth exemplary embodiment of a circuit according to the present invention.

DETAILED DESCRIPTION OF THE INVENTION

In the Figures, the same parts are given the same reference symbols. The radio receiver according to the present invention can be realized in different ways. Thus, for example, individual or groups of the illustrated blocks can be realized by suitable circuits, in particular integrated circuits. Furthermore, given a very high degree of integration, it is possible to realize the entire digital signal processing of the receiver in an integrated circuit, signal processing steps, such as filtering or non-linear weighting operations, being performed by computational operations. Within an integrated circuit, digital signal processors and other digital circuits, such as shift registers, flip-flops, etc., can be arranged together to realize a receiver according to the present invention.

Figure 2:
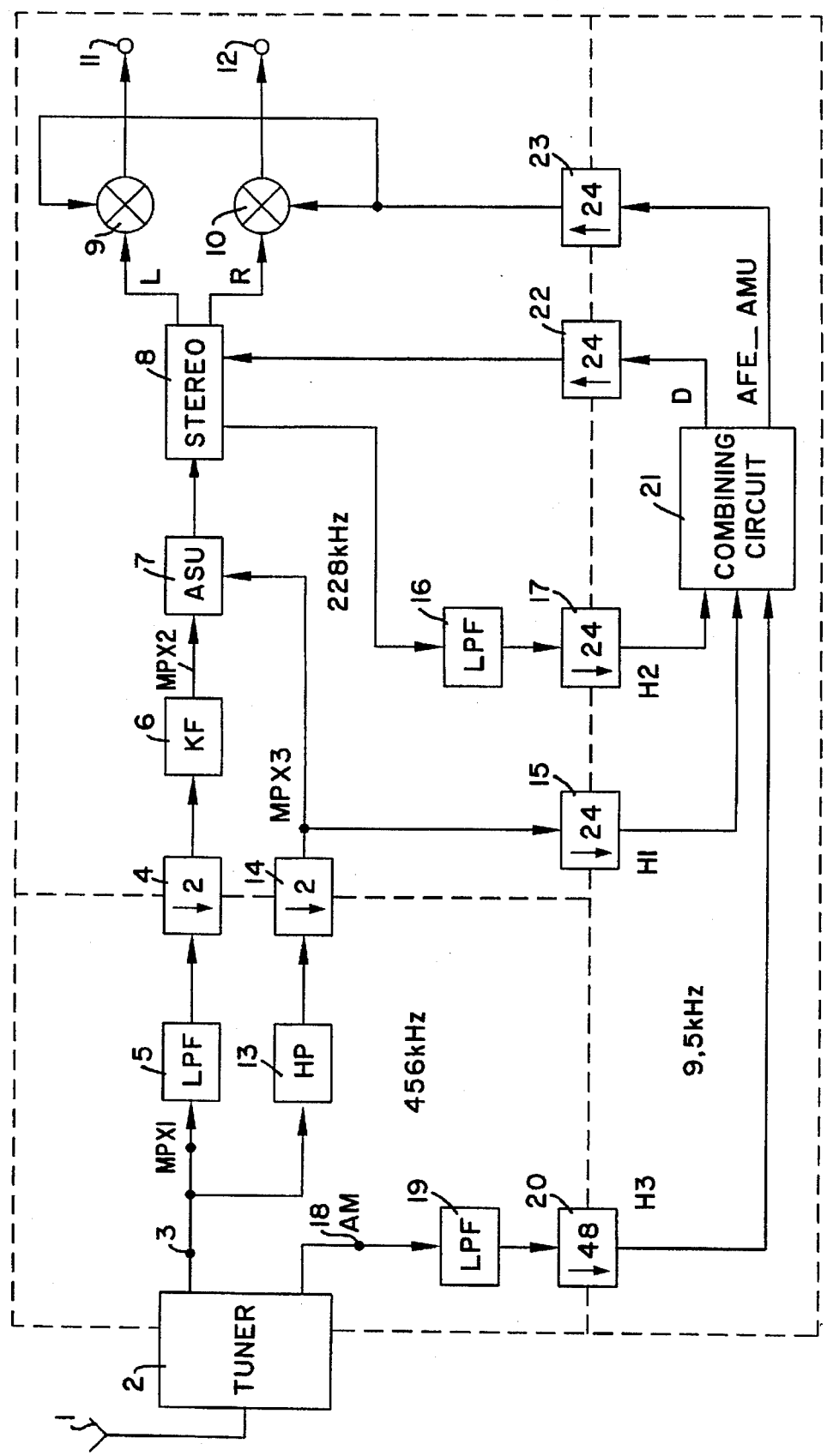
FIG. 2 shows a radio receiver circuit according to the present invention.

The exemplary embodiments clarified on the basis of FIGS. 1, 3, 7 and 8 are parts of a radio receiver having digital signal processing, for which an exemplary embodiment is shown in FIG. 2. To be able to better elucidate the exemplary embodiments and their function, the radio receiver depicted in FIG. 2 will first be described.

The signal received via an antenna 1 is amplified in a receiving part (tuner) 2 in a generally known way, selected and demodulated. A stereo multiplex signal MPX1 having a sampling rate of 456 kHz is available at an output 3 of the receiving part 2. To achieve a subsequent reduction in sampling rates—also called decimation—to 228 kHz without aliasing interference, a low-pass filter 5 is provided upstream from the sampling-rate reduction circuit 4. A low-pass filter having a level frequency response characteristic in the pass range is required to achieve a perfect further processing of the stereo multiplex signal. To economize on the expenditure required for this, particularly given a high sampling rate of 456 kHz, the exemplary embodiment of a radio receiver circuit shown in FIG. 2 provides for a simpler low-pass filter having a declining frequency response characteristic. The decline in the frequency response characteristic is compensated, however, in a subsequent compensating filter 6.

The stereo multiplex signal MPX2 is then fed via a circuit 7 for automatic interference suppression, which repeats sampling values, especially when spark interference occurs, from before the beginning of interference until the end of interference. Connected up to this circuit is a stereo decoder 8, which produces two audio signals L, R that are conducted via multiplier units 9, 10 to outputs 11, 12. From there, the audio signals are supplied via NF (audio- or low-frequency) amplifiers to the loudspeakers.

From the stereo multiplex signal MPX1, a signal is produced with the help of a high-pass filter 13 and a decimation circuit 14, which (signal) contains signal components which exist above the fundamental frequency range of the stereo multiplex signal, but are folded by the decimation circuit 14 into a lower frequency range. This signal MPX3 indicates various interference, such as that resulting from vehicle ignition sparks. It is used, on the one hand, to control the circuit 7 for automatic interference suppression and, on the other hand, to generate an auxiliary signal Hi through decimation of the sampling rate to 9.5 kHz at 15 decimation circuit.

Another auxiliary signal, whose sampling rate likewise amounts to 9.5 kHz, is generated from a balanced signal SY by means of low-pass filtering at low-pass filter 16 and decimation at 17. This (balanced signal SY) is formed, in turn, in the stereo decoder 8. There, as is well known, the stereo subcarrier is amplitude-demodulated to generate the differential signal L-R. This is achieved in that the subcarrier is multiplied by a subcarrier of the same phase position regenerated in the radio receiver. In the stereo decoder 8, the stereo subcarrier is additionally multiplied by a carrier that is rotated by 90° with respect to the reference carrier, through which means a signal is created, which is 0 in the case of symmetrical (balanced) sidebands of the stereo subcarrier and deviates correspondingly from 0 in the case of asymmetries (unbalanced sidebands). From this signal, the additional auxiliary signal H2 is generated by means of low-pass filtering at low-pass filter 16 and decimation at 17.

At an output 18, the receiving part 2 emits a signal AM, which is produced through amplitude demodulation of the FM intermediate frequency signal. In the depicted exemplary embodiment, this (FM intermediate frequency signal) likewise has a sampling rate of 456 kHz and is decimated by the factor, 48 after a low-pass filtering at low-pass filter 19, at decimation circuit 20, so that the resultant third auxiliary signal H3 has a sampling rate of 9.5 kHz.

In a circuit 21, the auxiliary signals H1, H2 and H3 are combined with one another to form control signals D and AFE_AMU, whose sampling rate initially amounts to 9.5 kHz, but is increased at decimation circuit 22 and decimation circuit 23 to 228 kHz. This is achieved by interpolating 24 sampling values, which in the simplest case consists in repeating each sampling value 24 times. The control signal D is fed to a control input of the stereo decoder 8 and is used there to switch over to mono-operation in the case of a disturbed reception. The signal AFE_AMU is supplied to the multiplier units 9 and 10, through which means volume is reduced should interference exist.

FIG. 1 depicts one exemplary embodiment of the circuit 21 (FIG. 2). The auxiliary signals H1, H2 and H3 are fed to inputs 25, 26, 27. The auxiliary signal H3 indicating the receiving field strength experiences an averaging with various time constants in two low-pass filters 28, 29. In dependence upon a signal DD2 to be clarified later, a changeover switch 30 routes one of the output signals from the low-pass filter 28 29 as a signal AMC. This signal is weighted at circuit 31 in the form of a noise-on curve to produce the noise-on damping AFE. The field-intensity signal having the smaller time constant is likewise weighted at circuit 32 (signal WF2). This is multiplied at circuit 33 by a signal AT1 for generating the control signal D, which is available at the output 34.

The absolute value is generated in each case initially at circuit 35 and circuit 36 by the auxiliary signals H1 and H2 supplied at input 25 and input 26. This can also be accomplished, for example, by squaring the auxiliary signals. Connected up to the absolute-value generation circuit 35 is a low-pass filter The resultant signals OAD and SD are combined at circuit 38. In so doing, a signal DD1=F1(OAD, SD) is formed. This function has, for example, the form F1=a1·OAD+b1·SD, the coefficients a1 and b1 being adjustable. Other functions are clarified in conjunction with the additional exemplary embodiments.

The signal DD1 still contains, however, extremely short spurious signals and is thus not suited for influencing the audio signals in the sense of a masking. It is, therefore, conducted through a time filter 39, at whose outputs, filtered interference signals AMU and AT1 are available. At circuit 40, the signal AMU is combined with the weighted field-intensity signal AFE pursuant to the function F2(AMU, AFE) to form a signal AFE_AMU, which is able to be tapped off at an output 41. The control signal D is generated with a function F3(AT1, WF2). Preferably, F2=AMU·AFE and F3=AT1·WF2.

In the exemplary embodiment according to FIG. 3, binary signals AHD and ASD are formed from the signals OAD and SD through threshold-value comparison circuits 42, 43, these binary signals AHD and ASD indicating, for example, with the level 1 the existence of an interference and, with the level 0, the non-existence of an interference. These signals are combined in a logical network 44, which is clarified in greater detail in FIG. 4. The time filter 39, shown in FIG. 1, is comprised in the exemplary embodiment according to FIG. 3 of a pulse-width discriminator 45 and of two asymmetrical integrators 46, 47. Exemplary embodiments of these circuits are indicated in FIGS. 5 and 6.

The effect of the pulse-width discriminator is that pulses of the signal DD1 below a prescribed width are not routed, rather only pulses exceeding the prescribed width. With the help of the asymmetrical integrators 46 and 47, the signals AMU and AT1 are brought to the value required for attenuation immediately after one specific pulse of the signal DD2 begins, while after the end of each pulse of the signal DD2, a slow decline follows.

Figure 4:
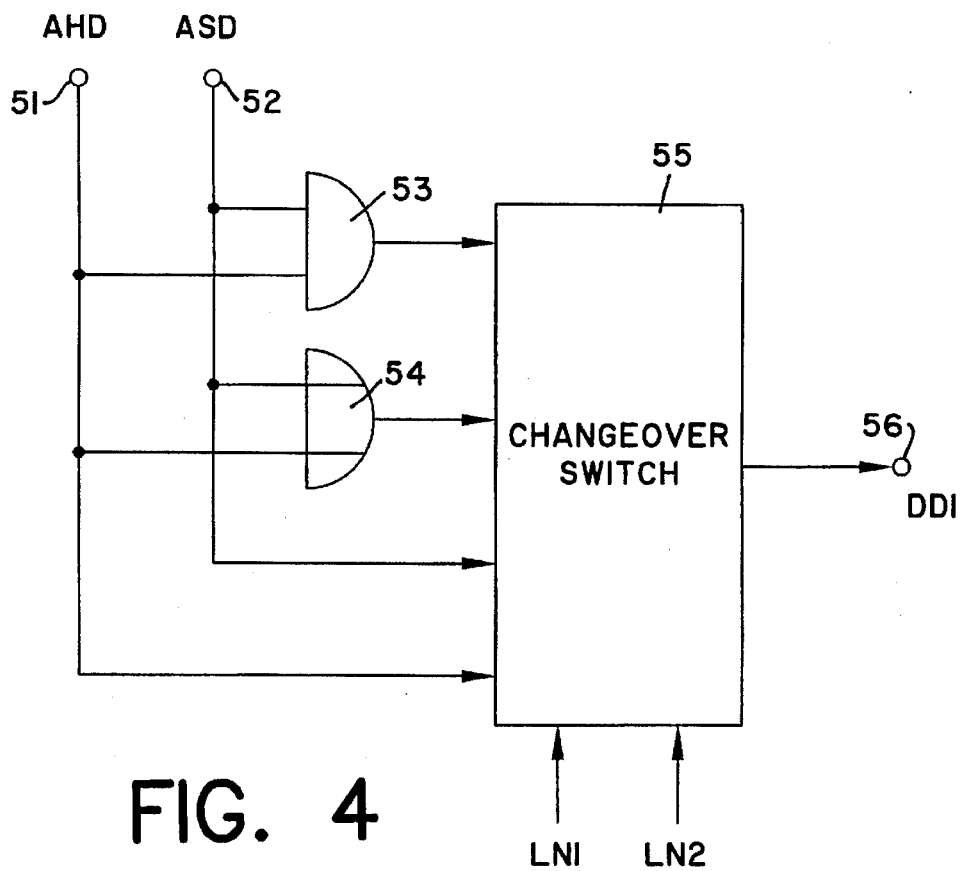
FIG. 4 shows an exemplary logic circuit used in the circuit shown in FIG. 3.

The logical network according to FIG. 4 allows the two signals AHD and ASD to be optionally combined in a logic operation. To this end, the two signals from the inputs 51, 52 are supplied via an AND circuit 53, via an OR circuit 54, and directly to a changeover switch 55 having four inputs. With the help of supplied control signals LN1 and LN2, either the output of the AND circuit 53, the output of the OR circuit 54, or one of the inputs 51, 52 can be connected to an output 56. In the case of a connection of the output 56 with the output of the AND circuit 53, the output signal DD1 only assumes level 1 when both input signals AHD and ASD are at level 1. Thus, an interference is only signalled when there are both spurious signals above the fundamental frequency range, as well as an asymmetry of the sidebands of the subcarrier. If the output 56 is connected to the output of the OR circuit 54, interference is already signalled when one of the two indications of interference is at hand.

Figure 5:
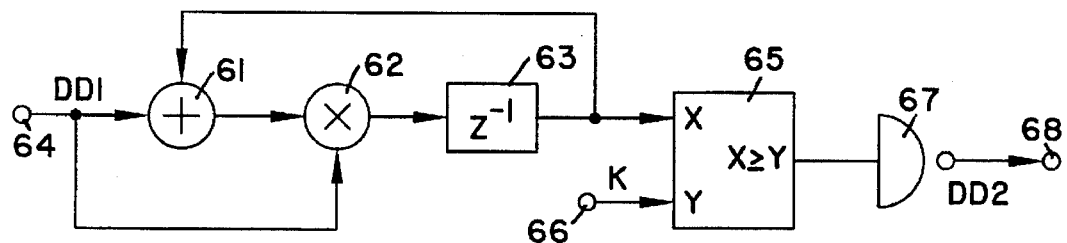
FIG. 5 shows an exemplary pulse-width discriminator circuit according to the present invention.
Figure 6:
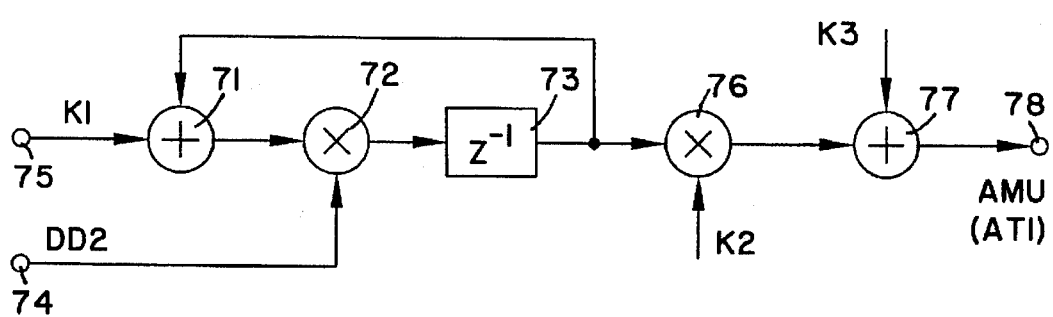
FIG. 6 shows an exemplary asymmetrical integrator circuit according to the present invention.

In the case of the pulse-width discriminator depicted in FIG. 5, a summing element 61, a multiplier unit 62, and a storage device 63 for one sampling value at a time make up an accumulator. The signal DD1 from an input 64 is supplied to the summing element 61 and the multiplier unit 62. For as long as the signal DD1 is equal to 0, the value 0 is also fed to a comparator 65. If the signal DD1 jumps to the value 1, the accumulation begins, the value in the storage device 63 increasing from the sampling instant in each case by 1. If a constant supplied to an input 66 is reached, then the comparator 65 transmits a signal via an inverter 67 to the output 68. To prevent the output signal from the integrator from flowing over the range of values given by the mantissa, a delimitation is provided (not shown in FIG. 6).

In the case of the exemplary embodiment of one of the asymmetrical integrators 46, 47 (FIG. 3) shown in FIG. 6, an accumulator is likewise provided, which is comprised of a summing element 71, a multiplier unit 72, and a storage device 73 for one sampling value. In dependence upon the signal DD2 supplied at 74, a constant K1 supplied at 75 is added with every clock pulse to the contents of the storage device 73, for as long as the signal DD2 has the value 1. The result is evaluated in another multiplier unit 76 with a constant K2, followed by a summing element 77 for adding another constant K3. The integrated signal can then be sampled from the output 78—in the case of the asymmetrical integrator 46, the signal AMU, otherwise the signal AT1.

A combination of the signals OAD and SD follows in the exemplary embodiment according to FIG. 7 with the help of a function F1=a1·OAD+b1·SD. A binary signal is subsequently formed at circuit 48, which is processed further as in the case of the exemplary embodiment according to FIG. 3.

FIG. 8 depicts an exemplary embodiment, in the case of which the signals OHD and SD are combined with various functions for the purposes of attenuation and channel separation, namely with the functions F1.1=a1·OHD+b1·SD at 38 and F1.2=a2·OAD+b2·SD at 38'. The further processing of the resultant signals DD1.1 and DD1.2 to the signals AMU and AT1 follows then as in the exemplary embodiment according to FIG. 3 at 48, 45 and 46, or 48', 45' and 47.

The different coefficients or constants used in the signal processing can be permanently programmed in the manufacturing of the radio receiver according to the invention or variably stored. A radio receiver according to the present invention having variable coefficients can, for example, be adapted to changing requirements by a service shop—for example when a car radio designed according to the invention is designated for use in a country having different transmission standards or when certain interference occurs often at the location of use.

What is claimed is:

1. A radio receiver for receiving a stereo multiplex signal and having digital signal processing, comprising:

a first circuit for forming a first auxiliary signal and a second auxiliary signal, the first auxiliary signal being determined as a function of signal components of the stereo multiplex signal above a useful frequency range of the stereo multiplex signal, the second auxiliary signal being determined as a function of one of a symmetry and an asymmetry of sidebands of a stereo subcarrier signal of the stereo multiplex signal;

a second circuit, coupled to the first circuit, for combining the first auxiliary signal and the second auxiliary signal to form an interference signal indicating the existence of interference in the stereo multiplex signal; and a third circuit, coupled to the second circuit, for forming a least one control signal as a function of the interference signal for altering at least one audio signal obtained by decoding the stereo multiplex signal.

2. The radio receiver according to claim 1, wherein the first auxiliary signal and the second auxiliary signal each include a binary signal, and wherein the second circuit includes a logic circuit for combining the first auxiliary signal and the second auxiliary signal in a logic operation to form the interference signal.

3. The radio receiver according to claim 1, wherein the second circuit weights the first auxiliary signal with a first predetermined coefficient to form a first weighted value, weights the second auxiliary signal with a second predetermined coefficient to form a second weighted value, adds the first weighted value and the second weighted value to form a sum value, and outputs a binary interference signal having a first state when the sum value is at least as great as a threshold value and having a second state when the sum value is less than the threshold value.

4. The radio receiver according to claim 1, wherein the second circuit weights the first auxiliary signal with a first predetermined coefficient and a third predetermined coefficient to form a first weighted value and a third weighted value, weights the second auxiliary signal with a second predetermined coefficient and a fourth predetermined coefficient to form a second weighted value and a fourth weighted value, adds the first weighted value and the second weighted value to form a first sum value, adds the third weighted value and the fourth weighted value to form a second sum value, outputs a first binary interference signal having a first state when the first sum value is at least as great as a first threshold value and having a second state when the first sum value is less than the first threshold value, and outputs a second binary interference signal having the first state when the second sum value is at least as great as a second threshold value and having the second state when the second sum value is less than the second threshold value, and wherein the at least one control signal includes a first control signal for attenuating the audio signal obtained by decoding the stereo multiplex signal and a second control signal for reducing channel separation in a stereo decoder, the first control signal and the second control signal being determined as a function of the first binary interference signal and the second binary interference signal.

5. The radio receiver according to claim 1, wherein the second circuit includes a filter circuit for time-filtering the interference signal.

6. The radio receiver according to claim 5, wherein the filter circuit includes a pulse-width discriminator coupled to at least one integrator having a variable time constant.

7. The radio receiver according to claim 5, wherein the third circuit multiples the time-filtered interference signal by a field strength signal, indicating a field strength of the stereo multiplex signal, to generate the control signal.

8. The radio receiver according to claim 7, wherein the time-filtered interference signal includes a first time-filtered interference signal and a second time-filtered interference signal, and the field strength signal includes a first field strength signal and a second field strength signal, and wherein the third circuit multiplies the first time-filtered interference signal by the first field strength signal to form a first control signal for attenuating the audio signal obtained by decoding the stereo multiplex signal and multiplies the second time-filtered interference signal by the second field strength signal to form a second control signal for reducing channel separation in the radio receiver.

9. A method for receiving a stereo multiplex signal in a radio receiver having digital signal processing, comprising the steps of:

forming a first auxiliary signal determined as a function of signal components of the stereo multiplex signal above a useful frequency range of the stereo multiplex signal;

forming a second auxiliary signal determined as a function of one of a symmetry and an asymmetry of sidebands of a stereo subcarder signal of the stereo multiplex signal;

combining the first auxiliary signal and the second auxiliary signal to form an interference signal indicating the existence of interference in the stereo multiplex signal; and forming at least one control signal determined as a function of the interference signal for altering an audio signal obtained by decoding the stereo multiplex signal.

10. The method according to claim 9, wherein the first auxiliary signal and the second auxiliary signal each include a binary signal, and wherein the combining step includes combining the first auxiliary signal and the second auxiliary signal in a logic operation to form the interference signal.

11. The method according to claim 9, wherein the combining step further includes the steps of weighting the first auxiliary signal with a first predetermined coefficient to form a first weighted value, weighting the second auxiliary signal with a second predetermined coefficient to form a second weighted value, adding the first weighted value and the second weighted value to form a sum value, generating a binary interference signal having a first state when the sum value is at least as great as a threshold value and having a second state when the sum value is less than the threshold value.

12. The method according to claim 9, wherein the combining step includes the steps of weighting the first auxiliary signal with a first predetermined coefficient and a third predetermined coefficient to form a first weighted value and a third weighted value, weighting the second auxiliary signal with a second predetermined coefficient and a fourth predetermined coefficient to form a second weighted value and a fourth weighted value, adding the first weighted value and the second weighted value to form a first sum value adding the third weighted value and the fourth weighted value to form a second sum value, generating a first binary interference signal having a first state when the first sum value is at least as great as a first threshold value and having a second state when the first sum value is less than the first threshold value, and generating a second binary interference signal having a first state when the second sum value is at least as great as a second threshold value and having a second state when the second sum value is less than the second threshold value, and wherein the step of forming at least one control signal includes the step of forming a first control signal for attenuating the audio signal obtained by decoding the stereo multiplex signal and a second control signal for reducing channel separation in a stereo decoder, the first control signal and the second control signal being determined as a function of the first binary interference signal and the second binary interference signal.

13. The method according to claim 9, wherein the combining step includes the step of time-filtering the interference signal via a filter circuit.

14. The method according to claim 13, wherein the filter circuit includes a pulse-width discriminator coupled to at least one integrator having a variable time constant.

15. The method according to claim 13, wherein the step of forming at least one control signal includes the step of multiplying the time-filtered interference signal by a field strength signal, indicating a field strength of the stereo multiplex signal, to generate the control signal.

16. The method according to claim 15, wherein the time-filtered interference signal includes a first time-filtered interference signal and a second time-filtered interference signal, wherein the field strength signal includes a first field strength signal and a second field strength signal, the step of multiplying the time-filtered interference signal including the steps of multiplying the first time-filtered interference signal by the first field strength signal to generate a first control signal for attenuating the audio signal by decoding the stereo multiplex signal, and multiplying the second time-filtered signal by the second field strength signal to generate a second control signal for reducing channel separation in a stereo decoder of the radio receiver.

* * * * *

UNITED STATES PATENT AND TRADEMARK OFFICE
CERTIFICATE OF CORRECTION

PATENT No. :   5,661,809

DATED   :   August 26, 1997

INVENTOR(S):   Djahanyar Chahabadi et al.

It is certified that error appears in the above-identified patent and that said Letters Patent is hereby corrected as shown below:

Column 1 line 6, before "invention" insert --present--;

Column 4, line 7, delete "Hi" and insert --H1--;

Column 4, line 8, delete "15";

Column 4, line 9, after "circuit" insert --15--;

Column 4, lines 13 and 26, before "17" insert --decimation circuit--;

Column 4, line 32, delete "factor, 48" and insert --factor 48--;

Column 4, line 67, after "filter" insert --37--.

Signed and Sealed this

Sixteenth Day of June, 1998

*Attest:*

BRUCE LEHMAN

*Attesting Officer*   *Commissioner of Patents and Trademarks*